United States Patent [19]

Akiyama et al.

[11] Patent Number: 5,354,528
[45] Date of Patent: Oct. 11, 1994

[54] PROCESS FOR PRODUCING PREFORM FOR METAL MATRIX COMPOSITE

[75] Inventors: Masaru Akiyama, Abiko; Kenji Maniwa, Chigasaki, both of Japan

[73] Assignee: Tokai Carbon Co., Ltd., Tokyo, Japan

[21] Appl. No.: 811,340

[22] Filed: Dec. 20, 1991

[30] Foreign Application Priority Data

Dec. 26, 1990 [JP] Japan .................. 2-414316

[51] Int. Cl.$^5$ .................. B28B 1/26; B28B 1/52; B29C 43/02
[52] U.S. Cl. .................. 264/87; 164/97; 264/113; 264/510; 264/517; 264/255
[58] Field of Search .................. 264/86, 87, 510, 517, 264/131, 129, 113, 121, 255, 279, 279.1, 309; 164/97

[56] References Cited

U.S. PATENT DOCUMENTS

| | | | |
|---|---|---|---|
| 3,594,273 | 7/1971 | Williams | 264/87 X |
| 3,649,406 | 3/1972 | McNish | 264/131 X |
| 4,078,965 | 3/1978 | Berger, Jr. et al. | 264/87 X |
| 4,131,664 | 12/1978 | Flowers et al. | 264/113 X |
| 4,166,090 | 8/1979 | Green et al. | 264/87 X |
| 4,216,682 | 8/1980 | Ban et al. | 164/97 X |
| 4,269,800 | 5/1981 | Sommer et al. | 264/113 |
| 4,426,340 | 1/1984 | Goller et al. | 264/113 X |
| 4,476,916 | 10/1984 | Nusbaum | 164/97 X |
| 4,548,253 | 10/1985 | Funatani et al. | 164/97 X |
| 4,586,554 | 5/1986 | Tank et al. | |
| 4,587,707 | 5/1986 | Nishida et al. | 164/98 |
| 4,632,794 | 12/1986 | Mori et al. | 264/87 |
| 4,667,727 | 5/1987 | Barlow et al. | 164/97 |
| 4,669,523 | 6/1987 | Sabatie et al. | 164/98 X |
| 4,696,866 | 9/1987 | Tanaka et al. | 164/97 X |
| 4,715,422 | 12/1987 | Tommis et al. | 164/97 |
| 4,798,694 | 1/1989 | Sugata et al. | 264/86 X |
| 4,810,442 | 3/1989 | Hillig et al. | 264/86 X |
| 4,995,444 | 2/1991 | Jolly et al. | 164/97 |

FOREIGN PATENT DOCUMENTS

| | | |
|---|---|---|
| 60-190545 | 9/1985 | Japan . |
| 2-88730 | 3/1990 | Japan . |
| 2106433A | 4/1983 | United Kingdom . |
| 2114621 | 8/1983 | United Kingdom .......... 264/87 |

*Primary Examiner*—Karen Aftergut
*Attorney, Agent, or Firm*—Armstrong, Westerman, Hattori, McLeland & Naughton

[57] ABSTRACT

A process for producing a preform having a buffer layer for use in compositing a metal matrix composite where the buffer layer is provided at a boundary between a composited portion and a non-composited portion of a metallic material in the metal matrix composite. The process includes subjecting a first dispersion including a liquid medium and a ceramic whisker homogeneously dispersed in the liquid medium to filtration under pressure to form a primary processed preform having a volume fraction of 12 to 30%, depositing on the primary processed preform a second dispersion including a liquid medium and, homogeneously dispersed therein, a binder and at least one member selected from the group consisting of a short fiber and a ceramic whisker, and drying the primary processed preform to form a buffer layer having a volume fraction lower than the volume fraction of the primary processed preform and in a range from 2 to 10%.

5 Claims, No Drawings

PROCESS FOR PRODUCING PREFORM FOR METAL MATRIX COMPOSITE

BACKGROUND OF THE INVENTION

The present invention relates to a process for producing a preform for a metal matrix composite. More particularly, the present invention is directed to a process for producing a preform for use as a reinforcement in the formation of a metal matrix composite to strengthen the site of a material subject to severe thermal load, for example, a piston head of an internal combustion engine.

A ceramic whisker, for example, a whisker of silicon carbide or silicon nitride, has been put to practical use as a reinforcement for a member exposed to severe service environment, for example, an engine member, by virtue of its excellent mechanical strength, thermal stability and chemical stability. For example, in an internal combustion engine, the piston crown repeatedly undergoes a severe thermal load which brings about fusing damage or cracking. For this reason, Roger Anthony Day proposed to composite and strengthen the piston crown with a ceramic whisker, which has contributed to a significant improvement in the service life of the piston (see U.K. Patent No. 2106433). According to this patent, the compositing is locally conducted between the member reinforced with a ceramic whisker and the metal. The local compositing, however, is unfavorable because it is liable to bring about breaking due to the occurrence of cracking attributable to a difference in the thermal expansion between the materials at the boundary between the composited portion and the non-composited portion during the use of the piston, or the blistering of the matrix. For this reason, in order to avoid a rapid change in the thermal expansion behavior at the boundary between the composited portion and the non-composited portion, a proposal has been made of an inorganic-fiber-reinforced composite member having the so-called "functionally gradient structure". In this structure the volume fraction (Vf) of the reinforcing inorganic fiber in the non-composited portion is made smaller than that in the center of the composited portion and, at the same time, the volume fraction (Vf) is gradually increased with a gradient from the boundary between the non-composited portion and the composited portion towards the center of the composited portion (see Japanese patent application Kokai publication No. 60-190545). Further, a proposal has also been made of a ceramic-whisker-reinforced light alloy composite material wherein a buffer composite portion is continuously interposed between the composited portion and the non-composited portion (metal matrix portion) (see Japanese patent application Kokai publication No. 2-88730).

The feature of each of the Japanese patent application Kokai publications No. 60-190545 and No. 2-88730 resides in producing a preform having a functionally gradient structure from a reinforcing fiber, disposing it on a matrix metal at a site to be reinforced, and pressure casting the resultant matrix metal.

The above-described prior art method, however, has a drawback that the step of producing a preform having a functionally gradient structure is troublesome and unsuitable for practical use as a mass production technique.

Specifically, in the method disclosed in the Japanese patent application Kokai publication No. 60-190545, it is necessary to make a preform for the compositing from a single inorganic fiber molding wherein the density increases from the boundary between the composited portion and the non-composited portion towards the center of the composited portion, or to prepare a plurality of preforms different from each other in the density and disposing these preforms in combination so that the density increases from the boundary between the composited portion and the non-composited portion towards the center of the composited portion. Therefore, in this method, a troublesome and difficult working procedure is required in forming the preform.

In the method disclosed in the Japanese patent application Kokai publication No. 2-88730, the preform is produced by filtering a ceramic fiber having a diameter of 2 to 15 $\mu$m to form a primary processed preform having a volume fraction (Vf) of 2 to 8 %, pouring a dispersion containing a ceramic whisker having a diameter of 2 $\mu$m dispersed therein on one surface of the primary processed preform to again conduct the filtration treatment through the use of the primary processed preform as a filter medium, thereby impregnating the ceramic whisker into the primary processed preform structure so that the volume fraction (Vf) has a continuous gradient from 10 to 35%. Since, however, the filtration treatment is conducted in both the step of forming a primary processed preform and the step of forming a preform, the filtration treatment should be conducted twice. In particular, in the second filtration (the step of filtering a ceramic whisker), clogging occurs, which causes the working time to be prolonged, so that the manufacturing procedure becomes troublesome.

SUMMARY OF THE INVENTION

An object of the present invention is to eliminate the drawbacks of the prior art and to provide a process for producing a preform for metal matrix composite having a buffer layer to be provided at the boundary (the outer periphery of the preform) between the non-composited portion and the composited portion in compositing a metallic material.

The present invention provides a process for producing a preform for metal matrix composite having a buffer layer to be provided at the boundary between a composited portion and a non-composited portion in compositing a metallic material, comprising the steps of:
 (a) subjecting a first dispersion comprising a liquid medium and a ceramic whisker homogeneously dispersed in the liquid medium to filtration under reduced pressure to form a primary processed preform having a volume fraction (Vf) of 12 to 30%,
 (b) depositing on said primary processed preform a second dispersion comprising a liquid medium and, homogeneously dispersed therein, at least one member selected from the group consisting of a short fiber and a ceramic whisker and a binder, and
 (c) drying said primary processed preform to form a buffer layer having a volume fraction (Vf) lower than that of said primary processed preform and in the range of from 2 to 10%.

The process for producing a preform for metal matrix composite according to the present invention is simple in the constitution and easy to practice, which enables the preform to be easily mass produced.

When the preform for a metal matrix composite produced according to the process of the present invention is disposed in a mold so that the buffer layer of the preform comes into contact with the non-composited portion of the metal matrix and is pressure cast, a buffer layer is formed between the non-composited portion and the composited portion, so that neither cracking nor deformation occurs at the boundary between the non-composited portion and the composited portion even when the resulting composite is exposed to a severe environment, for example, a heat history.

THE PREFERRED EMBODIMENTS OF THE INVENTION

In the present invention, the ceramic whisker used in the primary processed preform is at least one acicular single crystal fiber selected from the group consisting of those of silicon carbide, silicon nitride, alumina, zirconia and potassium titanate, and preferably has a diameter of 0.1 to 2 $\mu$m and a fiber length of 1 to 100 $\mu$m.

The ceramic whisker is used in the form of a dispersion thereof homogeneously dispersed in a liquid medium. Water and an organic solvent may be used as the liquid medium. Preferred examples of the organic solvent include methanol, ethanol, acetone and ether.

The dispersion containing a ceramic whisker dispersed therein is hereinafter referred to as the "first dispersion" for convenience.

The primary processed preform is formed by filtering the first dispersion through a filter having a desired configuration. Therefore, the primary processed preform may be molded into any of a disk, a hollow cylindrical disk, a square plate, a rectangular plate, a triangular plate and other plates having various configurations.

The volume fraction (Vf) of the primary processed preform is preferably 12 to 30%. When it is less than 12%, the composite reinforcement effect is unsatisfactory. On the other hand, when it exceeds 30%, the structure becomes so dense that when the preform is pressure cast in a mold together with the metal matrix, the metal constituting the matrix cannot be smoothly impregnated into the composited portion.

In the present invention, separately from the first dispersion, use is made of a second dispersion comprising a liquid medium and, homogeneously dispersed therein, a short fiber or a ceramic whisker and a binder. The short fiber used in the second dispersion is at least one member selected from the group consisting of those of silicon carbide, silicon nitride, alumina, alumina-silica, zirconia and potassium titanate. The ceramic whisker is at least one acicular single crystal fiber selected from among those of silicon carbide, silicon nitrite, alumina, zirconia and potassium titanate. This ceramic whisker preferably has a larger fiber diameter and a larger fiber length than those of the acicular single crystal fiber used as the ceramic whisker in the first dispersion. This is because the volume fraction (Vf) of the buffer layer should be smaller than that of the primary processed preform, which makes it necessary to use a ceramic whisker having a larger fiber diameter and a larger fiber length than those of the ceramic whisker used in the primary processed preform.

Further, although no confirmation has been made at the present time, it is expected that since the buffer layer covers and protects the fine whisker which may adversely affected the human body when the fiber is inhaled in a large amount in the working procedure, no fiber would scatter into an exterior environment.

In the present invention, colloidal alumina and silica are suitable as a binder used in the second liquid medium together with the short fiber or ceramic whisker.

Water or a suitable organic solvent may be used as the second liquid medium.

The second dispersion prepared by homogeneously dispersing the above-described short fiber or ceramic fiber and binder in a liquid medium is applied and deposited on the primary processed preform by means of spraying or brushing.

The primary processed preform coated with the second dispersion is dried to form a buffer layer on the surface of the primary processed preform. The thickness of the buffer layer is preferably 1 mm or less, still preferably 0.1 to 0.5 mm. This is because when the thickness of the buffer layer becomes large, the strength of the boundary between the non-composited portion and the composited portion lowers. It is important that the thickness of the buffer layer be regulated so that the buffer layer has a smaller volume fraction (Vf) than that of the primary processed preform through the regulation of the fiber diameter, fiber length, dispersion concentration, etc., of the short fiber and ceramic whisker dispersed in the second dispersion. It is impossible to prepare a preform having the intended buffer layer unless such a requirement is satisfied. The volume fraction (Vf) of the buffer layer is preferably 2 to 10%. This is because when it is less than 2%, the buffer layer is so fragile that peeling easily occurs, while when it exceeds 10%, the buffer layer exhibits no satisfactory buffer action.

EXAMPLES:

A silicon carbide whisker having an average diameter of 0.5 $\mu$m and a length of 10 to 30 $\mu$m (TOKA WHISKER manufactured by Tokai Carbon Co., Ltd.) was homogeneously stirred and dispersed in water by means of a juicer mixer. The dispersion was allowed to flow in a filter and filtered under gas pressure, and the cake was dried to form a primary processed preform having a volume fraction of 15% in the form of a ring having an inner diameter of 26.5 mm, an outer diameter of 62.5 mm and a thickness of 17 mm.

72 g of a 95% alumina short fiber having a diameter of 2 to 10 $\mu$m and a fiber length of about 100 $\mu$m was added to 400 cc of water together with 80 cc of colloidal silica (manufactured by Nissan Chemical Industries, Ltd.), and the mixture was sufficiently stirred to prepare a homogeneous dispersion. The dispersion was homogeneously applied and deposited by spraying on the whole surface of the primary processed preform, and the coating was dried to form a buffer layer having a thickness of about 0.3 mm on the surface of the primary processed preform. The volume fraction (Vf) of the resultant buffer layer was 8%, and the observation of the texture of the cross section under a scanning electron microscope (SEM) has revealed that the boundary between the buffer layer and the primary processed preform had a continuous texture.

The preform for a metal matrix composite produced according to the above-described procedure was disposed in a mold, and molten metal forging was conducted under a pressure of 800 kg/cm through the use of a molten ACSA aluminum alloy (740° C.) as a matrix metal to prepare three metal matrix composites in total.

The metal matrix composites were heat-treated according to temper designation T6 of JIS H 001 (1988). As a result, in all the three composites, neither cracking nor deformation, etc., was observed at the boundary between the preform and the matrix metal.

For comparison, compositing was conducted in the same manner as that described above, except that use was made of a primary processed preform having no buffer layer. When the metal matrix composites were heat-treated, cracking was observed at the boundary in two out of the three composites.

As is apparent from the above-described comparative experiment, the provision of a buffer layer on the surface of a primary processed preform is very useful for mass-producing a preform for locally reinforcing a piston head or the like which is subject to a severe thermal load.

What is claimed is:

1. A process for producing a preform having a buffer layer for use in compositing a metal matrix composite where said buffer layer is provided at a boundary between a composited portion and a non-composited portion of a metallic material in said metal matrix composite, said process comprising the steps of:
    (a) subjecting a first dispersion comprising a liquid medium and a ceramic whisker having a fiber diameter and a fiber length homogeneously dispersed in said liquid medium to filtration under pressure to form a primary processed preform having a volume fraction of 12 to 30% of said whisker,
    (b) depositing on a surface of said primary processed preform a second dispersion comprising a liquid medium and, homogeneously dispersed therein, a binder and at least one member selected from the group consisting of a short fiber and a ceramic whisker, said at least one member having a fiber diameter and a fiber length larger than said fiber diameter and said fiber length of said ceramic whisker of said primary processed preform, and
    (c) drying said primary processed preform, having said second dispersion deposited thereon, to form said buffer layer of said preform on said surface of said primary processed preform, said buffer layer having a volume fraction of said at least one member lower than said volume fraction of said whisker in said primary processed preform and in a range from 2 to 10% of said at least one member.

2. A process for producing a preform having a buffer layer according to claim 1, wherein said ceramic whisker of said first dispersion is at least one acicular single crystal fiber selected from the group consisting of silicon carbide, silicon nitride, alumina, zirconia and potassium titanate.

3. A process for producing a preform having a buffer layer according to claim 1, wherein said at least one member is a short fiber and said short fiber is at least one fiber selected from the group consisting of silicon nitride, alumina, alumina-silica, zirconia and potassium titanate.

4. A process for producing a preform having a buffer layer according to claim 2, wherein said at least one member is a ceramic whisker and said ceramic whisker of said second dispersion is at least one acicular single crystal fiber selected from the group consisting of silicon carbide, silicon nitride, alumina, zirconia and potassium titanate.

5. A process for producing a preform having a buffer layer according to claim 1, wherein said at least one member is a ceramic whisker and said ceramic whisker of said second dispersion is at least one acicular single crystal fiber selected from the group consisting of silicon carbide, silicon nitride, alumina, zirconia and potassium titanate.

* * * * *